US006692246B1

(12) United States Patent
Schwartz

(10) Patent No.: US 6,692,246 B1
(45) Date of Patent: Feb. 17, 2004

(54) APPARATUS FOR UNINTERRUPTED MULTI-LAYER DISC MANUFACTURING

(75) Inventor: Vladimir Schwartz, Lexington, MA (US)

(73) Assignee: Valdas Ltd. (A British Virgin Island Corp.), New York, NY (US)

( * ) Notice: Subject to any disclaimer, the term of this patent is extended or adjusted under 35 U.S.C. 154(b) by 0 days.

(21) Appl. No.: 09/703,493

(22) Filed: Oct. 31, 2000

(51) Int. Cl.⁷ ............................................... B29D 11/00
(52) U.S. Cl. .................... 425/127; 425/174.4; 425/186; 425/193; 425/810; 425/DIG. 108; 425/425
(58) Field of Search ................................. 425/125, 127, 425/174.4, 186, 193, 425, 810, DIG. 108; 264/106, 107

(56) References Cited

U.S. PATENT DOCUMENTS

| 4,157,931 A | * | 6/1979 | Bricot et al. ................. 156/230 |
| 4,472,124 A | * | 9/1984 | Kashihara et al. .......... 264/107 |
| 4,907,956 A | * | 3/1990 | Ezaki et al. ................. 264/494 |
| 5,626,885 A | * | 5/1997 | Vromans .................... 264/1.33 |

FOREIGN PATENT DOCUMENTS

JP     09-115191    *  5/1997

* cited by examiner

Primary Examiner—Jan H. Silbaugh
Assistant Examiner—Donald Heckenberg
(74) Attorney, Agent, or Firm—Blank Rome LLP

(57) ABSTRACT

The present invention is an improved method and apparatus for replicating various types of optical discs such as CDs and DVDs. The apparatus includes a support plate attached to a rotatable shaft. The support plate has a top surface for supporting a stamper, ultraviolet ("UV") curable resin, and a support substrate. The UV curable resin forming the information layer on the support substrate of the optical disc. In the method, the stamper is placed on top of the support plate, and UV curable resin is applied to the top of the stamper having information containing data pits formed therein. The support substrate is placed on top of the stamper with the UV curable resin sandwiched in-between. The apparatus is rotated to spread the resin onto both surfaces of the support substrate and stamper. The joined surfaces of the support substrate and stamper are exposed to UV radiation. The newly formed optical disc is removed from the apparatus and comprises a support substrate and an information layer, with the information layer containing data pits precisely replicated from the data pits of the stamper.

16 Claims, 2 Drawing Sheets

APPARATUS FOR UNINTERRUPTED MULTI-LAYER DISC MANUFACTURING

FIELD OF THE INVENTION

The present invention relates to optical discs such as compact discs ("CDs") and digital versatile discs ("DVDs"), which are used to store digital and digitized information such as computer software, video and sound recordings. More particularly, the present invention relates to an improved method and apparatus for manufacturing such discs.

BACKGROUND OF THE INVENTION

DVDs and CDs are used as a storage media for digital and digitized information. Digital data is physically stored on these discs and more specifically on an information layer on such discs. The disc information layer contains digital data pits which are three-dimensional micron sized pits containing the digitized information. These discs store large amounts of information. In the case of DVDs, some formats may carry up to 28 gigabytes of video, music or software. Optical discs are typically read with CD players, DVD players, or ROM disc drives. A laser device in the disc players read the data via a laser beam. In this method, the laser sends out a light beam and a sensing device receives a reflected signal from the disc information layer.

Optical discs such as DVDs and CDs are typically made from one or more component discs of optical grade polycarbonate. In the process of manufacturing an optical disc, a nickel stamper (a metal matrix that contains digital data in the form of data pits and protrusions) is used to form an information carrying layer in the polycarbonate. Specifically, polycarbonate is injected into a mold holding a nickel stamper. A negative image of the pits is formed in the polycarbonate during the molding process. The molded image which consists of data pits is subsequently covered with a reflective coating. The reflective coating is sealed with a protective layer, such as a lacquer or the like.

A typical CD or DVD manufacturing process involves the steps of input data preparation, glass mastering, metalization and galvanics, and disc replication. The input data preparation process involves preparing digital tape or CD-R that contain digital data encoded according to a known error correction standard.

During the glass mastering process, the digital data is input into a computing device of a laser beam recorder. This involves a laser "burning" digital data pits in a uniform layer of photo-resist that covers the top surface of a glass master. Typically, glass masters are manufactured from highly polished, circular glass pieces (for example, 240 mm in diameter and 6 mm thick) covered with a layer of photo-resist material. The glass mastering process involves laser beam recording or conversion of digital data into geometrically shaped data pits. The data pits are formed in the photo-resist layer covering the glass master's top surface. Subsequently, the photo-resist covered glass master surface is vacuum metalized (with silver, nickel, or other suitable materials) to make it electrically conductive. Once vacuum metalized, the glass master is ready for use in the electro-forming process of creating a nickel stamper.

The metalization and galvanics process of forming a nickel stamper involves glass master vacuum metalization (with a silver or nickel layer) and subsequent "copying" of the glass master via a galvonic or electro-forming process. The data pits in the glass master are precisely replicated in the electro-forming process as nickel ions are gradually dissolved in a nickel sulfate solution and deposited over the electrically conductive surface of the glass master. After the desired stamper thickness is achieved (determined by a current/time/deposition rate calculation according to Faraday's law), the glass master and stamper are removed from the electro-forming galvanic cell. Subsequently, the nickel stamper is separated from the surface of the glass master. The nickel stamper, a negative copy of the glass master, contains the "reverse image" data pits of the glass master. The nickel stamper is circular, flat, electrolytic nickel substrate approximately 140 mm in diameter and 300 microns thick.

The disc replication process involves taking a previously prepared nickel stamper and inserting into a disc mold of an injection-molding machine. During the injection molding process, plastic discs are replicated. These plastic discs are typically made of polycarbonate or acrylic. The replicated discs represent "a plastic copy" of the nickel stamper which contains the digital data. The discs are then vacuum metalized with a thin layer of aluminum, silver, or gold. The metalized discs are protected with a coating of UV curable resin to prevent metal corrosion. In the case of DVDs, additional pressing is required in the form of disc bonding. The disc bonding process is required since the DVD discs are constructed from two halves, both of which may contain digital data information. The discs are then decorated, packaged and shipped to distributors, retailers or consumers.

The various molding machines capable of producing CDs and DVDs are generally very expensive and inefficient. The optical disc market expects to increase substantially mainly due to the proliferation of DVD video and CD/DVD-R applications.

The demands for faster, less expensive optical discs with increased data density necessitate the improved manufacturing of such discs. As described above, the disadvantages of a lengthy, labor intensive and complicated manufacturing process are unacceptable. Accordingly, there is a need for an improved method and apparatus for manufacturing optical discs.

SUMMARY OF THE INVENTION

The present invention provides an improved method and apparatus for manufacturing optical discs by applying at least one data containing information layer on at least one side of a support substrate. The present invention provides applying at least one data containing information layer on at least one side of a support substrate. The apparatus and method of the present invention separates the typical optical disc manufacturing process into two steps by applying an information layer to a previously manufactured support substrate, instead of molding a support substrate and information layer together in one step.

The apparatus for applying at least one data information layer on at least one side of a support substrate to produce an optical disc may be called a "Spin-On Information Layer" ("SPOIL") station. A SPOIL station includes a support plate attached to a rotatable shaft that may be connected to an electric motor or other device for rotating the apparatus about a vertical axis. The support plate has a top surface for supporting a stamper, ultraviolet ("UV") curable resin, and a support substrate. The UV curable resin forms the information layer on the support substrate of the optical disc. The stamper has a first side and a second side opposite the first side. The second side has digital information in the form of data pits. In use, the stamper is placed on the top surface of the support plate, with the first side of the stamper placed against the top surface of the support plate. UV curable resin is applied to the second side of the stamper. The support substrate is placed on the second side of the stamper with the UV curable resin sandwiched in-between. The stamper is preferably held on the support plate by vacuum or magnetic force during rotation of the apparatus to uniformly spread the UV curable resin between the stamper and support substrate.

A method of manufacturing optical discs using the above-described apparatus comprises the following steps: placing a stamper on a support plate of the apparatus; depositing an UV curable resin on the top surface of the stamper; placing a support substrate on top of the stamper with the UV curable resin sandwiched in-between; rotating a rotatable shaft of the apparatus about a vertical axis to spread the resin onto both surfaces of the support substrate and stamper; exposing the joined surfaces of the support substrate and stamper to UV radiation; removing the newly formed optical disc comprising the support substrate and the UV cured resin information layer from the surface of the stamper; vacuum metalizing the optical disc, especially the information layer with a reflective coating; and, sealing the metalized disc with a protective coating. The newly formed optical disc comprises a support substrate and an information layer, with the information layer containing data pits precisely replicated from the data pits of the stamper.

A second embodiment of the apparatus of the present invention consists of a multi-position spin station for manufacturing more than one optical disc at a time. The apparatus includes at least one stamper spin station, at least one stamper changing device, and at least one UV curing station. The multi-position manufacturing apparatus significantly increases optical disc manufacturing throughput, and allows for an uninterrupted disc manufacturing process.

The dimensional precision of data pits replicated with the SPOIL process is generally equal to or better than data pits formed by a standard injection molding process. Furthermore, vacuum metalized optical discs made from the SPOIL process exhibit better than average optoelectric characteristics.

Various other features, objects, and advantages of the invention will be made apparent to those skilled in the art from the accompanying drawings and detailed description thereof.

DETAILED DESCRIPTION OF THE INVENTION

Figure 1:
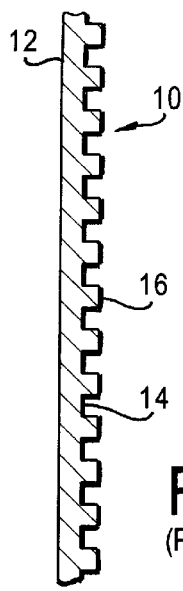
FIG. 1 is an enlarged cross-sectional view of a nickel stamper used in manufacturing optical discs as known in the prior art.

As shown in FIG. 1, prior art stampers 10 include a metal substrate 12 that contains digital data in the form of data pits 14 and protrusions 16 that are used to form an information carrying layer on replicated optical discs. The stamper 10 typically comprises a circular, flat nickel electrolytic substrate 12 approximately 140 mm in diameter and 300 microns thick.

Nickel stampers are manufactured utilizing an electro-forming or electro-plating galvanic process from a glass master. This process involves laser beam recording or conversion of digital data into geometrically shaped data pits. The data pits are formed in a photo-resist layer covering the glass master's top surface. Subsequently, the photo-resist covered glass master surface is vacuum metalized (with silver, nickel, or other suitable materials) to make it electrically conductive. Once vacuum metalized, the glass master is ready for use in the electro-forming process of creating a nickel stamper.

The data pits in the glass master are precisely replicated in the electro-forming process as nickel ions are gradually deposited over the conductive surface of the glass master. After the desired stamper thickness is achieved, the glass master and stamper are removed from the electro-forming galvanic cell. Subsequently, the nickel stamper, a negative copy of the glass master, is separated from the surface of the glass master.

Figure 2:
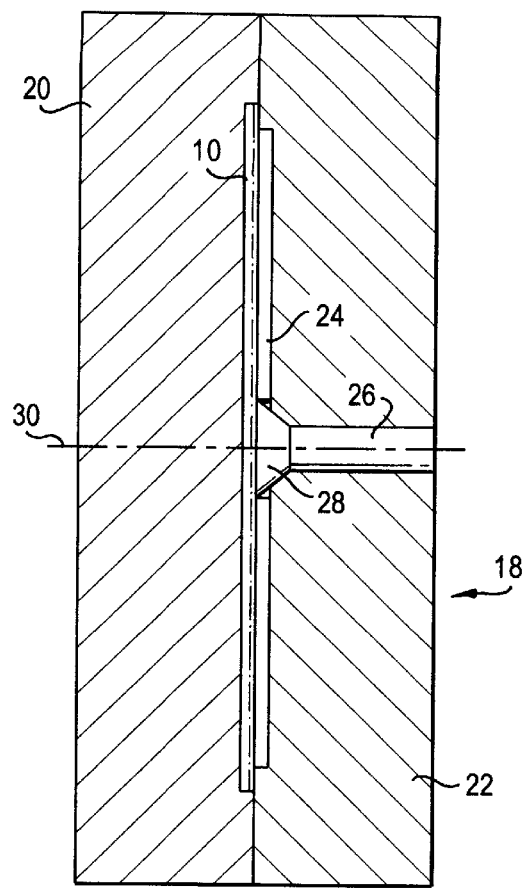
FIG. 2 is a cross-sectional view of a disc mold used for manufacturing optical discs as known in the prior art.

The current preferred method for manufacturing optical discs specifically includes an injection molding process. FIG. 2 illustrates an example of an injection mold 18 used in prior art optical disc manufacturing processes. The injection mold 18 includes a first half 20 and a second half 22 that are joined together to form a disc molding cavity 24. The mold 18 further includes a rotatable shaft 26 extending through the second half 22 of the mold for rotating the mold 18 about a vertical axis 30. The rotatable shaft 26 has an end 28 which attaches to the center of a nickel stamper 10.

During the injection molding process, optical discs preferably made of plastic, such as polycarbonate or acrylic, and having a data information layer formed therein are replicated in the following manner. First, an electro-formed nickel stamper 10 is inserted into the first half 20 of the mold 18 and attached to the end 28 of the rotatable shaft 26. The second half 22 of the mold is joined to the first half 20 of the mold. The nickel stamper 10 is encoded with digital data information in the form of data pits 14 and protrusions 16, as shown in FIG. 1.

Next, molten plastic, preferably polycarbonate or acrylic, is injected into the disc mold cavity 24 formed between the first half 20 and second half 22 of the mold, adjacent to the nickel stamper 10. The molten plastic is pressurized against the data pits 14 and protrusions 16 of the nickel stamper 10. The molten plastic hardens taking the shape of a disc with one surface containing a precise imprint or "negative" copy of the data pits 14 and protrusions 16 of the nickel stamper 10. Thus, a negative image of the data pits 14 and protrusions 16 of the nickel stamper 10 is formed in the plastic disc 32 during the molding process, as shown in FIGS. 3 and 4.

Figure 3:
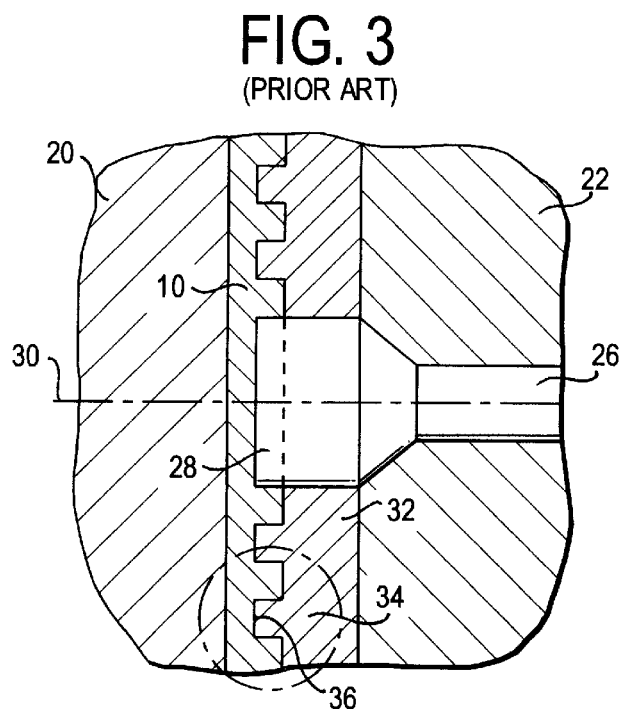
FIG. 3 is an enlarged fragmentary cross-sectional view of the mold of FIG. 2.
Figure 4:
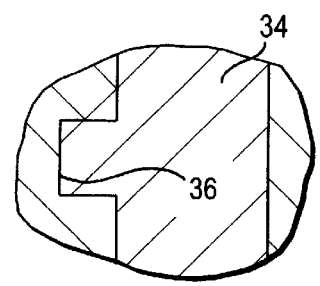
FIG. 4 is a further enlarged fragmentary cross-sectional view of FIG. 3 showing a portion of an optical disc within the mold of FIGS. 2 and 3.

As shown in FIGS. 3 and 4, the optical disc 32 is bonded to the nickel stamper 10 to create a reverse imprint of the data pits 14 and protrusions 16 of the nickel stamper 10 on the optical disc 32. The optical disc 32 comprises a support substrate 34 and an information layer 36 molded or embossed on the support substrate 34. The information layer 36 consists of the digital data transferred from the data pits 14 and protrusions 16 of the nickel stamper 10 and formed on one side of the optical disc 32.

In the next step in the process, the optical disc 32 is removed from the disc mold 18 via a pick and place device (not shown). The disc 32 is eventually covered with a reflective coating then sealed with a protective layer of lacquer or the like. Subsequent optical discs having the same digital imprint of the nickel stamper are manufactured using the same process described above.

A modern injection-molding machine can mold discs at a rate of approximately 1200 discs per hour. Thus it takes approximately three seconds to manufacture a single disc using this process. Manufacturing a disc with new music or new data requires changing the stamper to one with the desired data encoded thereon. Changing a stamper may take up to 15 to 20 minutes, due to operator handling time and the thermal stability of the injection-molding machine. Therefore, in order to increase disc production, manufacturers often utilize double cavity molds, where two discs may be molded at once in approximately 4.5 seconds. Alternatively, manufacturers may utilize additional molding machines to increase disc production. However, double cavity molding machines are complex and difficult to operate. In fact, only the largest, most sophisticated disc manufacturers are capable of using this technology reliably.

The present invention involves a new method and apparatus for manufacturing optical discs having a support substrate with at least one data information layer applied to at least one side of the support substrate. Currently both the support substrate and the information layer are manufactured in a single injection molding process. The present invention discloses a method and apparatus for manufacturing optical discs by applying at least one information layer on at least one side of a previously manufactured support substrate. In this way, optical discs can be manufactured more efficiently and more economically than known prior art manufacturing processes.

Various methods may be used to manufacture a support substrate of an optical disc. Support substrates are preferably manufactured from optical quality polycarbonate or acrylic sheets that are laser cut into disc shaped substrates. The typical sheet thickness for a CD is approximately 1.2 mm, and for a DVD it is approximately 0.6 mm. Support substrates may also be manufactured using a multi-cavity injection-molding machine to produce up to eight to ten disc shaped substrates at once. Both of these methods offer substantial reductions in the costs of manufacturing optical discs. The use of the present invention would even make it more economical for the support substrates to be manufactured by independent molding shops rather than the disc manufacturers themselves.

Figure 5:
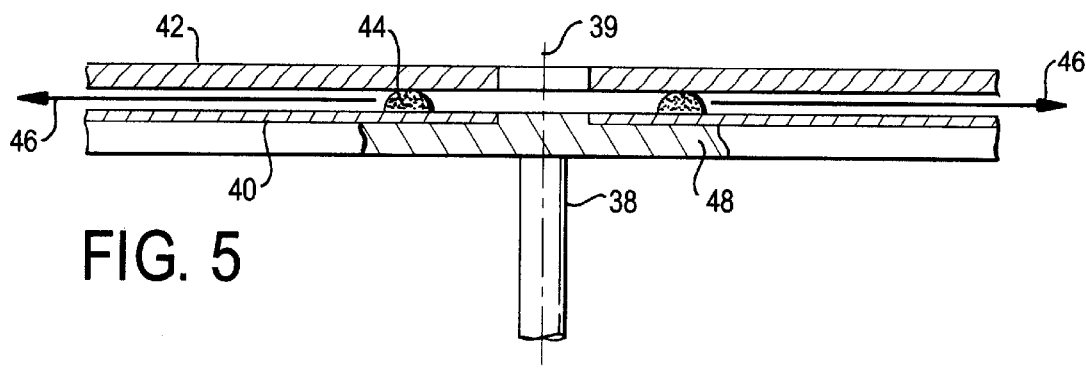
FIG. 5 is a side elevational view, partially in cross-section, of a single spin station manufacturing apparatus for manufacturing optical discs in accordance with the present invention.

Referring now to FIG. 5, an apparatus 37 for manufacturing an information layer on a support substrate of an optical disc in accordance with the present invention is shown. The apparatus 37 or SPOIL station, is used for applying an information layer on a support substrate. The apparatus 37 includes a horizontal support plate 48 attached to a rotatable shaft 38 which may be connected to a servo-controlled electric motor (not shown) for rotating the shaft 38 about a vertical axis 39. A conventionally manufactured nickel stamper 40 is horizontally and centrally placed on a top surface 47 of the support plate 48. The nickel stamper 40 is preferably held on the support plate 48 during rotation of the apparatus 37 by a vacuum or magnetic force. The nickel stamper 40, having a first side 43 and a second side 45 opposite the first side 43 with data pits 41 formed therein, is oriented on the support plate 48 so that the first side 43 is placed against the top surface 47 of the support plate 48 and the second side 45 with the data pits 41 is exposed. An ultraviolet ("UV") curable resin 44 is deposited on the exposed second side 45 of the nickel stamper 40. A conventionally manufactured support substrate 42 is horizontally and centrally placed on top of the nickel stamper 40 with the UV curable resin 44 sandwiched in-between.

The SPOIL process utilizes a conventionally manufactured nickel stamper 40 and UV curable resin 44. The UV resin preferably has a viscosity level of approximately 20 to 50 centipoids and a refractive index of approximately 1.5 to 1.55. The UV resin 44 forms the disc information layer on the support substrate 42. During the process, the nickel stamper 40 is horizontally and centrally placed on the support plate 48 of the apparatus 37. A vacuum or a magnetic force is used to hold the stamper 40 against the support plate 48 during rotation. A precise amount of UV resin in the form of circular beads 44 are deposited on the top surface 45 of the stamper 40. The top surface 45 having digital information containing data pits 41 formed therein. The support substrate 42 is then horizontally and centrally placed on the top surface 45 of the stamper 40. The apparatus is rotated by an electric motor or the like by rotating the shaft 38 about vertical axis 39 at speeds of up to 5,000 rpm. Centrifugal force propels the UV resin 44 outward from the center of the stamper 40 and then uniformly spreads onto both surfaces of the support substrate 42 and the stamper 40 as shown by arrows 46. The selection of appropriate rotation speeds for the stamper 40 and the support substrate 42 improves layer uniformity and removes excess amounts of resin. At the end of the process, a formed information layer will have a thickness of approximately 3 to 6 microns. However, a layer of up to 50 microns may be achieved with a 200–300 centipoid UV resin. Preferably, while joined together, the support substrate 42 and the nickel stamper 40 are exposed to UV radiation for approximately 1.5 seconds. The resin layer 44 solidifies due to UV initiated polymer cross-linking.

The surface energies or adhesion properties of the plastic substrate 42 and nickel stamper 40 differ substantially, so that the UV resin formed layer adheres well to the plastic substrate 42 but not to the nickel stamper 40. When the optical disc is lifted out off of the stamper surface 45, it consists of a support substrate and an informational layer. The informational layer contains precisely replicated data pits from the stamper. The newly manufactured optical disc is then vacuum metalized with a reflective coating. The reflective coating is then sealed with a protective layer of lacquer or the like. The above-described method can also be applied to manufacturing dual layer DVDs.

Figure 6:
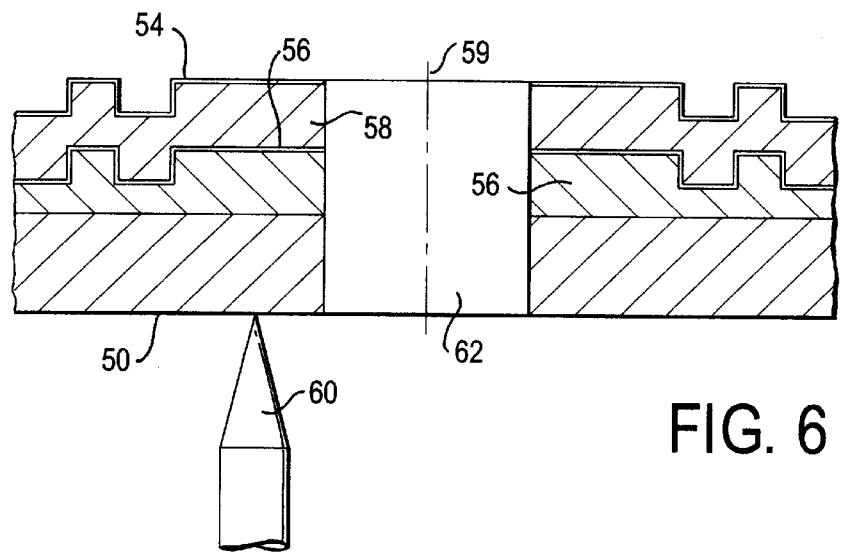
FIG. 6 is an enlarged fragmentary cross-sectional view of an optical disc manufactured in accordance with the manufacturing apparatus of the present invention.

FIG. 6 is an enlarged fragmentary cross-sectional view of a dual layer DVD manufactured in accordance with the apparatus and method of the present invention. In the case of a dual layer DVD, a single layer metalized optical disc undergoes the SPOIL process twice. The dual layered disc as shown in FIG. 6 comprises a support substrate 50, a first information layer 56, a first metal reflective layer 52, a second information layer 58, and a second metal reflective layer 54. The first metal reflective layer 52 is preferably metalized with gold and the second metal reflective layer 54 is preferably metalized with aluminum. The reflectivity or transmissivity of gold allows a laser beam stylus 60 of a disc player to read data from the second information layer 58 without any interference from the first information layer 56 or the first metal reflective layer 52.

Figure 7:
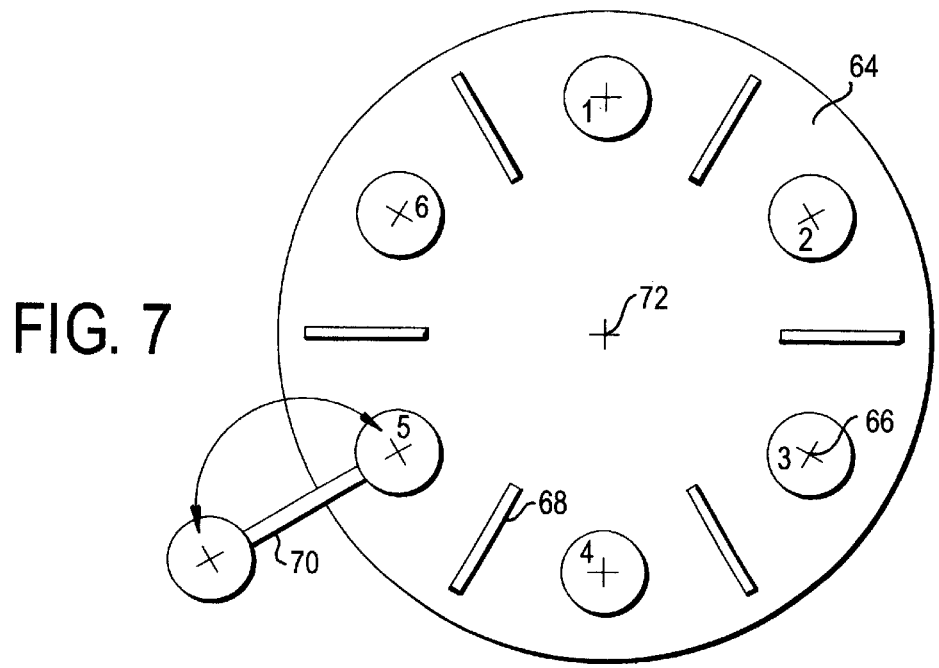
FIG. 7 is a top plan view of a multi-position manufacturing apparatus for manufacturing optical discs in accordance with the present invention.

FIG. 7 illustrates a multi-position, rotary spin station apparatus 64 for manufacturing more than one optical disc at a time using the above-described SPOIL process. The apparatus 64 includes a plurality of stamper spin stations 66, at least one stamper changing device 70 so that a variety of information containing discs may be manufactured by a single machine, and a plurality of UV curing stations 68 for curing the UV curable resin information layers of the optical discs. While the multi-position apparatus 64 is shown in FIG. 7 as a rotary conveyor apparatus being rotatable around an axis 72, the same apparatus may be implemented using a linear conveyor based apparatus with a plurality of spin stations, UV curing stations and stamper changing devices.

The multi-position SPOIL manufacturing apparatus 64 shown in FIG. 7 significantly increases optical disc manufacturing throughput. In addition, the apparatus 64 allows for an uninterrupted disc manufacturing process, including an automated stamper changing device to reduce operator interaction.

While the invention has been described with reference to preferred embodiments, those skilled in the art will appreciate that certain substitutions, alterations, and omissions may be made without departing from the spirit of the invention. Accordingly, the foregoing description is meant to be exemplary only and should not limit the scope of the invention set forth in the following claims.

I claim:

1. A multi-position apparatus for manufacturing a plurality of optical discs at a time, the apparatus comprising:

a movable conveyor;

a plurality of stamper spin stations positioned on the moveable conveyor;

wherein each stamper spin station includes a support plate attached to a rotatable shaft rotatable about a vertical axis, the support plate having a top surface for supporting a stamper placed on the top surface of the support plate, the stamper having a first side and a second side opposite the first side with the second side having digital information containing data pits formed therein, a layer of UV curable resin applied to the second side of the stamper, and a support substrate placed on the second side of the stamper with the resin sandwiched in-between;

at least one stamper changing device for changing digital information containing stampers; and a plurality of UV curing stations positioned on the moveable conveyor for curing the UV curable resin.

2. The apparatus of claim 1 wherein the rotatable shaft is rotatable about the vertical axis to uniformly spread the resin between the stamper and the support substrate.

3. The apparatus of claim 2 wherein the rotatable shaft is rotatable at speeds of up to 5,000 rpm.

4. The apparatus of claim 1 wherein the UV curable resin has a viscosity level of approximately 20 to 50 centipoids, and a refractive index of approximately 1.5 to 1.55.

5. The apparatus of claim 2 wherein the UV curable resin forms the information layer on the support substrate of a manufactured optical disc.

6. The apparatus of claim 5 herein the information layer contains replicated data pits from the stamper.

7. The apparatus of claim 5 wherein the information layer thickness is approximately 3 to 6 microns.

8. The apparatus of claim 1 wherein the movable conveyor is a rotary conveyor rotatable about a vertical axis.

9. The apparatus of claim 1 wherein the movable conveyor is a linear conveyor.

10. The apparatus of claim 1 wherein the first side of the stamper is adjacent to the top surface of the support plate.

11. The apparatus of claim 1 wherein the stamper is held on the support plate by a vacuum force.

12. The apparatus of claim 1 wherein the stamper is held on the support plate by a magnetic force.

13. The apparatus of claim 1 wherein the rotatable shaft is connectable to an electric motor for rotating the plurality of stamper spin stations about the vertical axis to uniformly spread the resin between the stamper and the support substrate.

14. The apparatus of claim 1 wherein the UV curable resin forms the information layer on the support substrate of a manufactured optical disc.

15. The apparatus of claim 14 wherein the information layer contains replicated data pits from the stamper.

16. The apparatus of claim 1 wherein the stamper is a nickel stamper.

* * * * *